United States Patent [19]

Alexander et al.

[11] Patent Number: 4,686,601
[45] Date of Patent: Aug. 11, 1987

[54] GROUND DISTANCE RELAY FOR AC POWER TRANSMISSION LINE PROTECTION

[75] Inventors: George E. Alexander, Wallingford; Stanley B. Wilkinson, Havertown, both of Pa.

[73] Assignee: General Electric Company, King of Prussia, Pa.

[21] Appl. No.: 782,833

[22] Filed: Oct. 2, 1985

[51] Int. Cl.$^4$ .............................................. H02H 3/26
[52] U.S. Cl. ...................................... 361/80; 361/82; 361/85; 361/76
[58] Field of Search ........................ 361/76, 77, 78, 79, 361/80, 82, 83, 85; 324/51, 52, 83 R

[56] References Cited

U.S. PATENT DOCUMENTS

| | | | |
|---|---|---|---|
| 3,374,399 | 3/1968 | Dewey | 361/80 |
| 3,882,361 | 5/1975 | Hinman, Jr. | 361/85 |
| 3,992,651 | 11/1976 | Hodges | 361/77 X |
| 4,034,269 | 7/1977 | Wilkinson | 361/80 X |
| 4,161,011 | 7/1979 | Wilkinson | 361/85 X |
| 4,342,062 | 7/1982 | Hodges | 361/77 X |
| 4,403,268 | 9/1983 | Keeney, Jr. | 361/82 X |
| 4,405,966 | 9/1983 | Cavero | 361/85 X |
| 4,420,788 | 12/1983 | Wilkinson et al. | 361/85 |
| 4,433,353 | 2/1984 | Wilkinson | 361/80 |

Primary Examiner—A. D. Pellinen
Assistant Examiner—Derek S. Jennings
Attorney, Agent, or Firm—Henry J. Policinski

[57] ABSTRACT

A phase comparison type ground distance relay for a predetermined phase of three-phase AC transmission line includes a phase coincidence detector responsive to phase coincidence between an operating signal and a plurality of polarizing signals. Zero suppression networks are utilized for deriving second and third polarizing signals in order to improve discrimination between internal and external faults; thereby increasing the reliability of the relay operation and the security of the protection system. The second polarizing signal comprises that portion of a signal which exceeds a predetermined threshold value and which is related to the product of a signal proportional to the net current flowing in all three phases of the power system and the positive sequence replica impedence of the transmission line. The third polarizing signal comprises the sum of a signal related to the product of a negative sequence component of the current flowing in a predetermined phase of the AC power system and the positive sequence replica impedence of the transmission line; and that portion of a signal which exceeds a predetermined threshold value and which is related to the product of the net current flowing in all three phases of the system and the positive sequence replica impedence of the transmission line.

13 Claims, 2 Drawing Figures

GROUND DISTANCE RELAY FOR AC POWER TRANSMISSION LINE PROTECTION

BACKGROUND OF THE INVENTION

The present invention relates to protective relay circuits for use in AC power distribution systems and more particularly to ground distance relays for transmission line protection.

Ground distance relays are utilized in protective systems for AC power transmission lines to detect faults between a phase and ground within a protected zone or portion of the transmission line. If such a fault is detected within the zone or reach of the relay, the ground distance relay may generate a signal to operate a circuit breaker in such a manner as to trip only the faulted phase of the transmission line.

Assuming a polyphase transmission line comprising phases A, B, and C, each particular ground distance relay should only detect faults related to a particular phase. For example, a ground distance relay for phase A should only detect phase A-to-ground faults. Furthermore, the ground distance relay for phase A should not be affected by a phase B-to-ground fault, a phase C-to-ground fault, or any phase-to-phase fault. The single phase discriminating detection operations are desired so that the fault related to the single phase will not cause a three pole trip of the circuit breaker. This is to be contrasted with a phase relay which detects faults involving more than one electrical phase, again within a designated zone or reach; and, upon detection of such a fault, generates a signal which will cause a three pole trip of the circuit breaker.

As indicated above, each particular ground distance relay should only detect faults within its protected zone or reach. The parameters of a ground distance relay are commonly selected to correspond to the parameters of the transmission line. For example, the parameters may be selected to provide a forward reach that may correspond to the forward distance of the zone of the transmission line under the protection of the particular relay. It is desired that the ground distance relay operate within its selected forward reach, thereby confining the protection of a particular ground distance relay to a selected zone within a protected system. The forward reach commonly defines the protected zone within the transmission line desired to be protected by the ground distance relay.

The desired operation of a ground distance relay may be hindered by the inability of the relay to distinguish between internal and external faults. Internal faults are those faults which occur within the protected zone or reach of the relay, whereas external faults are those that occur outside of the zone or relay reach. Undesired operation in response to external faults beyond the reach of the relay is sometimes referred to as overreaching.

The desired operation of a ground distance relay in single pole tripping schemes may also be hindered by the inability to distinguish between phase-to-ground faults and phase-to-phase faults. For example, heavy load flow in long lines can cause the impedances seen by a ground distance relay for a phase-to-phase fault to appear within its operating zone for one of the two operating phases. One phase tends to overreach while the other phase tends to underreach.

An additional problem which can adversely affect the operation of ground distance relays is operation on reverse type faults; that is, a fault occurring behind the ground distance relay. Such faults could be caused by, for example, a fault occurring behind the relay where a series capacitor is situated between the fault and the relay location such that the operate signal tends to reverse compared to a "normal" external fault. Further, in applications with heavy load and long relay reaches, the unfaulted phase relays have a tendency to operate for some unbalanced faults behind the relay.

Still another problem which can adversely affect the operation of a ground distance relay scheme is the generation of a three pole tripping signal upon occurrence of an inter-circuit fault (i.e., a double line to ground fault involving different phases, each phase associated with a different circuit). For example, for an A to ground fault on one circuit and a B to ground fault on a second circuit, both faults at the remote end of a double circuit line, it is desirable to block operation of the ground distance relays so that a single pole permissive trip signal without phase identification can be transmitted from the faulted end without causing an incorrect three pole trip. In the overall protective scheme, receipt of a single pole permissive trip signal without phase identification will not permit the phase relays to initiate a three pole trip but will allow the ground distance relays to initiate tripping of their respective poles of the circuit breaker when any one of them operates. Thus, when the faulted phase(s) is cleared at the remote end, the fault appears as a single line to ground fault and the ground distance relay responds to trip the faulted phase.

The desired operation of a protective relay system may also be degraded by non-operation of the ground distance relay upon the occurrence of a severe, close-in, double line to ground fault. Such a fault may severely impact the stability of the power system if not cleared very rapidly. Thus, the ground distance relays are desirable to operate for such a fault to increase the speed of clearing.

Accordingly, it is an object of the present invention to provide improved discrimination between internal and external faults thereby increasing the reliability of ground distance relay operation and the security of the protection system.

Another object of the present invention is to minimize erroneous operation of the ground distance relay due to operation on reverse type faults.

It is still another object of the present invention to prevent overreaching by the ground distance relay on single line-to-ground and double line-to-ground faults, even in the difficult case of faults having a substantial fault resistance.

It is yet another object of the present invention to prevent operation of the ground distance relay on a particular phase when the fault occurs on another phase.

It is still a further object of the present invention to inhibit operation of the ground relay on double line-to-ground faults in order to insure tripping of only the faulted phase during remote end inter-circuit type faults.

It is yet another object of the present invention to cause operation of the ground distance relay on severe close-in, double line-to-ground faults in order to improve the speed of operation of the relay system.

It is a further object of the present invention to prevent operation of the ground distance relay associated with unfaulted phases on severe close-in single line-toground faults, even in the difficult case of faults with substantial fault resistance.

These and other objects of the present invention will become apparent to those skilled in the art upon consideration of the following description of the invention.

SUMMARY OF THE INVENTION

The present invention comprises a ground distance relay for protecting a three-phase alternating current power transmission line. The relay is responsive to a phase-to-ground fault on any phase of the line in a predetermined zone of protection to generate a signal for producing single phase tripping in the faulted phase of a circuit breaker connected in the line. The ground distance relay develops first, second, and third polarizing signals, $V_{POL1}$, $V_{POL2}$, and $V_{POL3}$, respectively, which are coupled to the inputs of a four input phase angle comparator along with an operating signal, $V_{OP}$. $V_{POL1}$ is related to the positive sequence voltage of the protected phase. $V_{POL2}$ is a signal related to the zero sequence current $I_0$ of the protected phase. $V_{POL3}$ is related to the negative sequence current of the protected phase. The operating signal $V_{OP}$ is a function of the sum of component signals $I_A Z_{R1}$; $-I_0 Z_{R1}$; $I_0 K_0 Z_{R0}$; and $-V_{AG}$, i.e., $(I_A - I_0)Z_{R1} + I_0 K_0 Z_{R0} - V_{AG}$, so long as $I_0 Z_{R1}$ and $I_0 K_0 Z_{R0}$ are below the clipping level of certain clipping means provided for limiting these component signals to predetermined maximum values. In the above terms, $I_A$ is a quantity proportional to the current in the protected phase; $I_0$ is a quantity proportional to the net current flowing in all three phases (i.e., the zero sequence current in the protected phase); $Z_{R1}$ is the positive sequence replica impedance; $K_0 Z_{R0}$ is the zero sequence replica impedance; and $V_{AG}$ is a quantity proportional to the voltage between the protected phase and ground.

The replica impedance (or $Z_R$) is an impedance having the same phase angle and a magnitude proportional to the magnitude of the impedance of the zone of protection.

The positive sequence replica impedance (or $Z_{R1}$) is an impedance having the same phase angle and a magnitude proportional to the magnitude of the positive sequence impedance of the zone of protection.

The zero sequence replica impedance ($K_0 Z_{R0}$) is an impedance having the same phase angle and a magnitude proportional to the magnitude of the zero sequence impedance of the zone of protection.

DETAILED DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION OF THE PREFERRED EMBODIMENT

For the sake of convenience, certain elements described with reference to a specific figure will retain the same reference designation in the description of subsequent figures.

Figure 1:
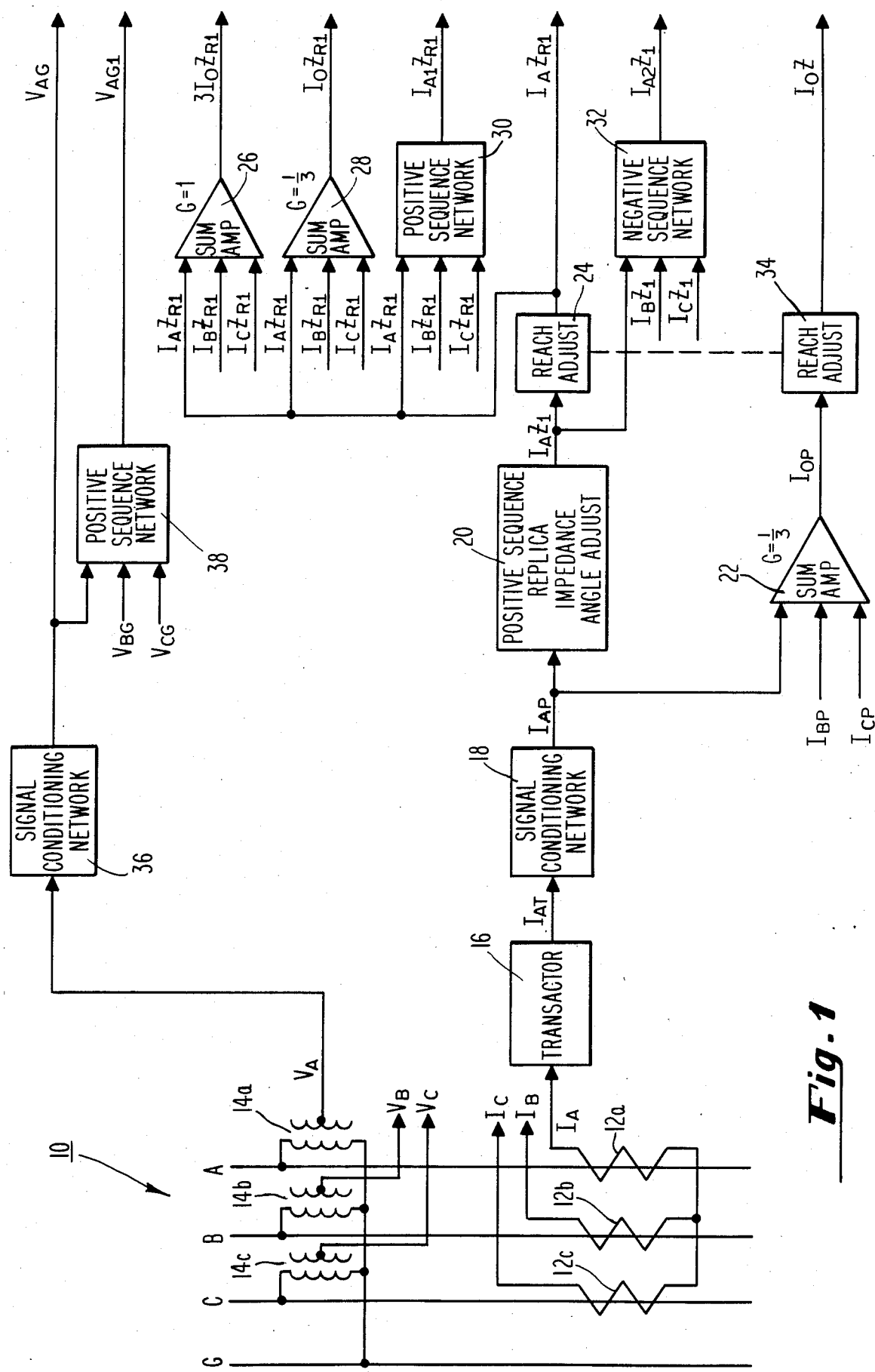
FIG. 1 is a schematic block diagram depicting development of desired source signals from a transmission line for use by a ground distance relay of the present invention.

Referring now to FIG. 1, there is shown a three-phase alternating current electric power transmission line, generally designated 10, having an A phase (A), a B phase (B), a C phase (C) and ground (G). Each of the three phases has associated with it means 12 for sensing the current in that particular phase as well as means 14 for sensing voltage on that phase. As is well known to those skilled in the protective relaying and power transmission art, current sensing means 12 may be a current transformer and voltage sensing means 14 may be a step down potential transformer. As shown in FIG. 1, a current sensing means is associated with each phase; means 12a being associated with phase A, 12b being associated with phase B and 12c being associated with phase C. Likewise, there is a separate voltage sensing means 14a associated with phase A, means 14b associated with phase B and means 14c associated with phase C. However, it is to be understood that although a specific type of current and voltage sensing scheme is depicted in FIG. 1, other schemes known in the art may be substituted for that depicted; the purpose being to obtain signals which are related to each phase voltage and each phase current as well as the sum of all three phase currents.

It should also be noted that the preferred embodiment of the ground distance relay of the present invention will be hereinafter described with respect to the A phase only. This is done for purposes of clarity and convenience, since the same detailed description would also apply to the B phase-to-ground and C phase-to-ground distance relays as well. The difference between the function and operation of a B phase-to-ground or C phase-to-ground distance relay and the operation of the A phase-to-ground distance relay described below is that the B and C phase-to-ground distance relays each utilize input signals from the transmission line which relate to its particular phase. Consequently, utilizing the following description which sets forth the A phase-to-ground distance relay embodiment, one skilled in the protective relaying art could construct a B phase-to-ground and/or C phase-to-ground distance relay in accordance with the present invention.

The output signal from the current sensing means 12a is coupled to a transactor 16. As is known in the art, the secondary voltage output of a transactor is related to the input current by a complex proportionality constant or vector operator known as the transfer impedance of the transactor. For the transactor 16 shown in FIG. 1, the transfer impedance is selected to be equal to a fixed transfer ratio and a fixed angle, for example, 85°. Consequently, the output of the transactor 16 is a signal $I_{AT}$ which has, for example, a fixed 85° phase shift with respect to the input $I_A$. Further detailed descriptions of transactors may be had by reference to U.S. Pat. No. 3,374,399, issued to Dewey which patent is assigned to the assignee of the present invention and the teachings of which are incorporated by reference in this detailed description as if fully set forth herein.

The output of the transactor 16 is coupled to the input of a first signal conditioning network 18. The signal conditioning network 18 comprises a low pass filter designed to attenuate high frequency transients which may be generated as a result of a fault on the transmission line. In the preferred embodiment, the signal conditioning network 18 attenuates those transients having a frequency higher than rated frequency and produces a phase delay of 25° at rated frequency. The output of the first signal conditioning network 18 is therefore a signal $I_{AP}$ representative of the input signal $I_{AT}$ with the high frequency transients attenuated and with a 25° lagging phase shift. Further details of the first signal conditioning network 18 are described with reference to FIG. 6 in U.S. Pat. No. 4,420,788, issued to the inventors of the present application and assigned to the assignee hereof. The teachings of this patent are incorporated into this detailed description by reference as if fully set forth herein.

The output of the first signal conditioning network 18 is coupled to the input of a positive sequence replica impedance angle adjust network 20 and one input of a first three input summing amplifier 22. The positive sequence replica impedance angle adjust network 20 comprises an all pass filter which provides a predetermined phase shift in order to get the proper angle adjustment. Such a circuit is shown and described in U.S. Pat. No. 4,403,268, issued to Keeney, and assigned to the assignee of the present invention herein. The teachings of this patent are incorporated into this detailed description by reference as if set forth herein.

The output of the positive sequence replica impedance angle adjust network 20 is a signal $I_AZ_1$ having substantially the same angle as the positive sequence line impedance angle, $Z_1$ being an impedance having the same angle as the line impedance angle. This signal $I_AZ_1$, is coupled to the input of a first reach adjust network 24. The first reach adjust network 24 comprises an adjustable gain amplifier. Adjustment of the gain sets the magnitude of the positive sequence replica impedance $Z_{R1}$ to be proportional to the positive sequence impedance of the desired zone of protection. The output ($I_AZ_{R1}$) of the first reach adjust network 24 is coupled to one input of a second three input summing amplifier 26; one input of a third three input summing amplifier 28; and one input of a first positive sequence network 30. The $I_BZ_{R1}$ and $I_CZ_{R1}$ signals, which are representative of signals derived from the B and C phases respectively in the same manner in which the $I_AZ_{R1}$ signal is derived from the A phase, are coupled to the second and third inputs of the second and third three input summing amplifiers 26 and 28 as well as to the other two inputs of the positive sequence network 30.

It is well understood by those skilled in the art of electrical power transmission distribution that phase voltages and currents in a three phase alternating current circuit can be resolved into three sets of symmetrical, balanced voltage and current vectors known as positive sequence, negative sequence and zero sequence components. It is also well known that certain circuits called "symmetrical component networks" can be connected to a three phase electric power system to provide an output signal that is proportional to the magnitude of a selected one of the three sequence components of voltage or current. The first positive sequence network 30 is one such network, having as one of its inputs the $I_AZ_{R1}$ signal representative of the current in the A phase of the transmission line multiplied by the positive sequence replica impedance $Z_{R1}$.

The output of the first positive sequence network 30 is selected to be proportional to the positive sequence component of the current in the A phase, $I_{A1}$, multiplied by the positive sequence replica impedance $Z_{R1}$. Sequence networks of this type are disclosed in U.S. Pat. No. 4,342,062 which issued on a continuation of now-abandoned application Ser. No. 41,137 of M. E. Hodges, filed May 21, 1979. Further detailed descriptions of symmetrical component networks can be had by reference to U.S. Pat. Nos. 3,992,651, issued to Hodges and 4,034,269, issued to Wilkinson, both of which patents as well as U.S. Pat. No. 4,342,062 are assigned to the assignee herein and the teachings of all are incorporated into this detailed description by reference is if fully set forth herein.

The output $I_AZ_1$ of the positive sequence replica impedance angle adjust network 20 is also coupled to the input of a negative sequence network 32. The negative sequence network 32 is preferably of the type described in the aforementioned U.S. Pat. Nos. 4,342,062; 3,992,651 and 4,034,269 which have been previously incorporated herein by reference. In accordance with the theory described above and the description set forth in the aforementioned referenced patents, the output of the negative sequence network 32 is the negative sequence component of the current in the A phase, $I_{A2}$, multiplied by the impedance $Z_1$. The $I_{BP}$ and $I_{CP}$ signals which are representative of the current signals acquired from the B and C phases of the power transmission system and which have been conditioned as described with respect to the $I_{AP}$ signal, are coupled to the second and third inputs of the first three input summing amplifier 22. The gain of the three input summing amplifier 22 is set equal to one-third; consequently, the output of the three input summing amplifier 22 is a signal $I_{OP}$ which is the zero sequence current component of the three phase signals $I_{AP}$, $I_{BP}$ and $I_{CP}$.

The output of the first three-input summing amplifier 22 is coupled to the input of a second reach adjust network 34. The second reach adjust network 34 comprises a gain adjustment network which sets the reach of the relay to be equal to the magnitude of the positive sequence impedance of the desired zone of protection. The output of network 34 is designated $I_0Z$ in FIG. 1. It is preferred that the means for adjusting the first 24 and second 34 reach adjustment networks be common such that adjusting the reach of one correspondingly adjusts the reach of the other.

The output of the voltage sensing means 14a is coupled to the input of a second signal conditioning network 36. The second signal conditioning network 36 is of the type previously described with respect to the first signal conditioning network 18. Consequently, the output of the second signal conditioning network 36 is a signal $V_{AG}$ which has been filtered and phase shifted with respect to the input $V_A$. The output, $V_{AG}$, of the second signal conditioning network 36 is coupled to a second positive sequence network 38. The $V_{BG}$ and $V_{CG}$ signals which are representative of the voltage signals acquired form the B and C phases respectively, and which have been conditioned as described with respect to the $V_{AG}$ signal, are also coupled to the input of the second positive sequence network 38. The second positive sequence network 38 is of the type previously described with respect to the first positive sequence network 30. The output $V_{AG1}$ of the second positive sequence network 38 is the positive sequence component of the input signal $V_{AG}$.

The gain of the second three-input summing amplifier 26 is set equal to one. Since the second and third inputs of the second three-input summing amplifier 26 are the B and C phase equivalents of the A phase signal $I_4Z_{R1}$ coupled to the first input, the output of the second three-input summing amplifier 26 is a signal representative of the net current flowing in all three phases, $3I_0$, multiplied by the positive sequence replica impedance $Z_{R1}$, or $3I_0Z_{R1}$.

The gain of the third three-input summing amplifier 28 is set equal to one-third. Since the second and third inputs of the third three-input summing amplifier 28 are the B and C phase equivalents of the A phase signal $I_4Z_{R1}$ coupled to the first input, the output is a signal $I_0$ which is representative of one-third of the net current flowing in all three phases multiplied by the positive sequence replica impedance $Z_{R1}$, or $I_0Z_{R1}$.

Figure 2:
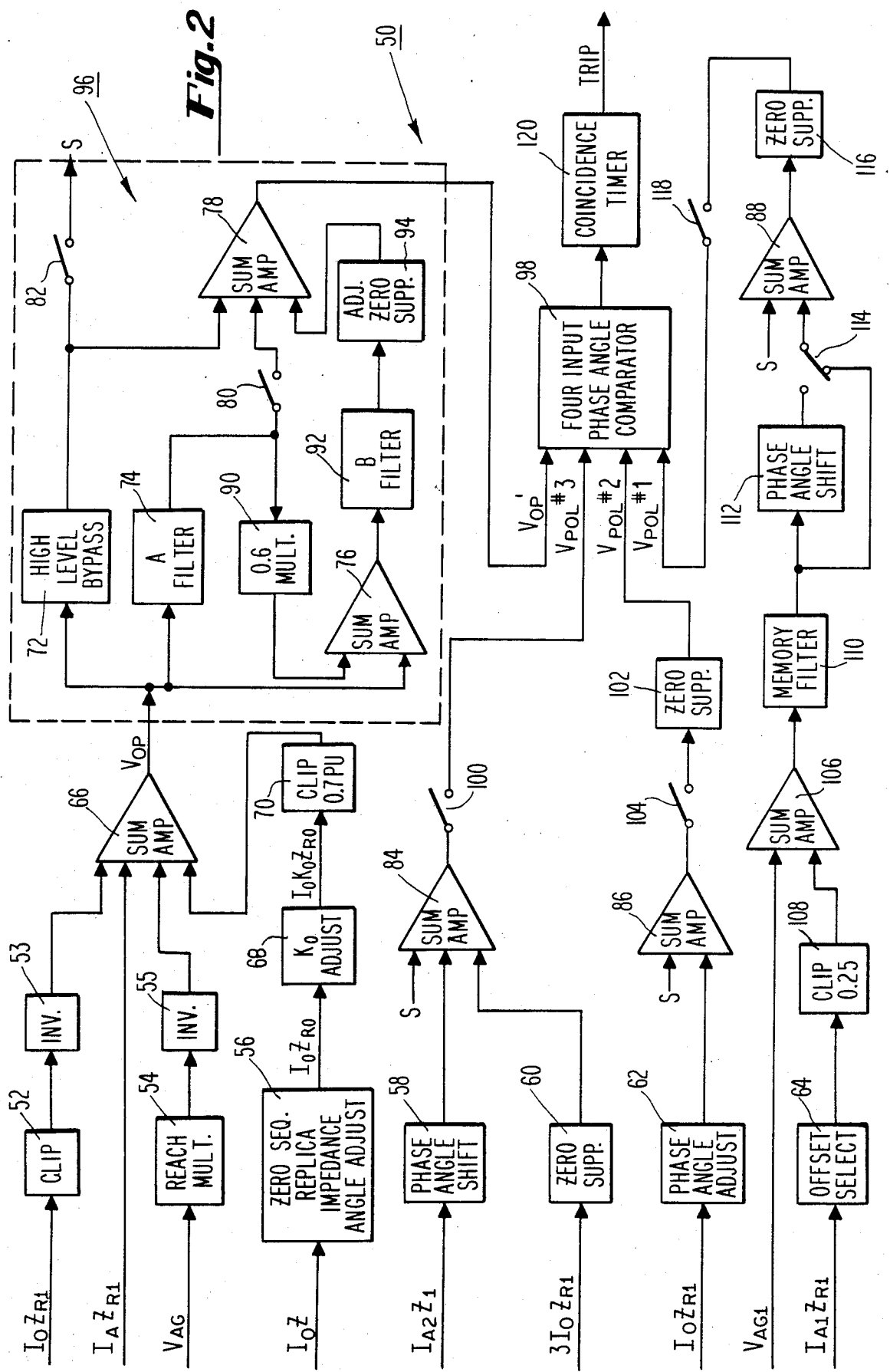
FIG. 2 is a functional diagram of a ground distance relay in accordance with the present invention.

Referring now to FIG. 2, there is shown a functional block diagram of the preferred embodiment of the ground relay of the present invention, which is generally designated 50. The ground relay 50 comprises a clipping network 52; a reach multiplier 54; a zero sequence replica impedance angle adjust network 56; a first phase angle shift network 58; a zero suppression network 60; a phase angle adjust network 62; and an offset select network 64. The clipping network 52 comprises a zero suppression circuit which passes that portion of the input signal which is greater than a pre-set level, and a differential amplifier which subtracts the output of the zero suppression network from the input signal. Consequently, the clipping network 52 passes only that portion of the input signal that is less than the pre-set level. In the preferred embodiment, the clipping network 52 is of the type shown and described under the heading "BOUNDS" of a publication entitled "Nonlinear Circuits Handbook", edited by Daniel H. Sheingold, published 1974 by Analog Devices Inc., Norword, Mass, which publication is incorporated in this detailed description as if fully set forth herein. The reach multiplier 54 comprises an adjustable gain amplifier which is used to modify the magnitude of the reach of the relay, $Z_{R1}$, by means of the magnitude of the restraint voltage, $V_{AG}$. The zero sequence replica impedance angle adjust network 56 comprises an adjustable angle "all pass filter" and is used to approximately match the angle of the $I_0Z$ signal to that of the zero sequence line impedance.

The zero suppression network 60 comprises a circuit which removes that portion of the input signal that is less than a pre-set level. Consequently, the zero suppression network 60 passes only that portion of the input signal which is greater than the pre-set level. In the preferred embodiment, the zero suppression network 60 is of the type shown and described under the heading "DEAD ZONE" on pages 25–26 of the aforementioned "Nonlinear Circuits Handbook" previously incorporated into this detailed description by reference. The phase angle adjust network 62 is used to adjust the angle of $I_0Z_{R1}$ on those systems in which the system source and line impedances have different angles. The offset select network 64 is an adjustable gain amplifier provided to select a forward offset reach, preferably of 0, 0.1, 0.2, 0.3 or 0.4 per unit of the positive sequence reach.

The signals developed in accordance with the detailed description set forth with respect to FIG. 1, are coupled to the inputs of the aforementioned networks as follows. $I_0Z_{R1}$ is coupled to the input of the clip network 52; $V_{AG}$ is coupled to the input of the reach multiplier 54; $I_0Z$ is coupled to the input of the zero sequence replica impedance angle adjust network 56; $I_{A2}Z_1$ is coupled to input of the phase angle network 58; $3I_0Z_{R1}$ is coupled to the input of the zero suppression network 60; $I_0Z_{R1}$ is coupled to the input of the phase angle adjust network 62; and $I_{A1}Z_{R1}$ is coupled to the input of the offset select network 64.

The output of the clip network 52 is inverted by a first inverter 53 and then connected to one input of a four-input summing amplifier 66. The $I_4Z_{R1}$ signal, developed as previously described, is coupled to a second input of the summing amplifier 66. The output of the reach multiplier network 54 is inverted by a second inverter 55 and then coupled to a third input of the summing amplifier 66. The output of the zero sequence impedance angle adjust network 56 is coupled to the input of a $K_0$ adjust network 68. The $K_0$ adjust network 68 comprises a gain selection circuit having a gain set equal to the ratio of the zero sequence impedance of the line to the positive sequence impedance of the line ($K_0 = Z_{0L}/Z_{1L}$). The output of the $K_0$ adjust network 68 is connected to the input of a second clip network 70, the second clip network 70 outputs a signal which, in the preferred embodiment is 0.7 per unit voltage of the input voltage. The second clip network 70 is of the type described with respect to the first clipping network 52. The output of the second clip network 70 is coupled to the fourth input of the four-input summing amplifier 66. The sum of the four inputs to the summing amplifier 66 can be expressed as $(I_A - I_0)Z_{R1} + I_0K_0Z_{R0} - V_{AG}$, when the inputs $I_0Z_{R1}$ and $I_0K_0Z_{R0}$ are below the clipping levels of clipping means 52 and 70, respectively.

The output of the summing amplifier 66 is an operating signal designated $V_{OP}$. The operating signal $V_{OP}$ is coupled to the input of a high level bypass network 72; an A filter 74; and one input of a first two input summing amplifier 76. The output of the A filter 74 is coupled to one input of a first three-input summing amplifier 78 through a first switch 80. The output of the high level bypass network 72 is coupled to a second input of the first three-input summing amplifier 78 and a second switch 82. The output "S" of the high level bypass network 72 is also coupled to one input of a second three-input summing amplifier 84; one input of a second two-input summing amplifier 86; and one input of a third two-input summing amplifier 88 through switch 82. The output of the A filter 74 is also coupled to the input of a 0.6 multiplier network 90. The output of the 0.6 multiplier network 90 is coupled to the second input of the first two-input summing amplifier 76.

The output of the first two-input summing amplifier 76 is coupled to the input of a B filter 92. The output of the B filter 92 is coupled to the input of an adjustable zero suppression network 94. The output of the adjustable zero suppression network 94 is coupled to the third input of the first three-input summing amplifier 78. The high level bypass network 72; the A filter 74; the 0.6 multiplier network 90; the first two input summing amplifier 76; the B filter 92; the adjustable zero suppression network 94; and the first three-input summing amplifier 78 together constitute an operating voltage circuit, generally designated 96, which outputs an operating voltage $V_{OP}'$. A detailed description of the operation of the operating voltage circuit 96 can be found in U.S. Pat. No. 4,420,788, previously incorporated into this detailed description by reference as if fully set forth herein.

The output $V_{OP}'$ of the operating voltage circuit 96 is coupled to one input of a four-input phase angle comparator 98. The output of the second three-input summing amplifier 84, designated $V_{POL3}$ is connected to a second input of the four-input phase angle comparator 98 through a third switch 100. The output of the phase angle adjust network 62 is coupled to the second input of the second two-input summing amplifier 86. The output of the amplifier 86 is coupled to the input of a second zero suppression network 102 through a fourth switch 104. The second suppression network 102 is of the type described with respect to the first zero suppression network 60. The output of the second zero suppression network 102, designated $V_{POL2}$, is coupled to a third input of the four input phase angle comparator 98.

The $V_{AG1}$ signal, developed as described with respect to FIG. 1, is coupled to one input of a fourth two-input summing amplifier 106. The output of the offset select network 64 is coupled to an input of a third clipping network 108. In the preferred embodiment, the third clipping network is of the type described with respect to the first clipping network 52 and limits the output to a magnitude which is 0.25 per unit of the input voltage. The output of the third clipping network 108 is coupled to the second input of the fourth two-input summing amplifier 106. The output of the fourth two-input summing amplifier is coupled to the input of a memory filter 110. As is well known in the art, the memory filter 110 comprises a band pass filter tuned to the power system frequency with a high Q such that the output after a fault is essentially equal to the prefault input to the filter for a period equivalent to the typical operating time of the relay. The output of the memory filter 110 is coupled to the input of a third phase shift network 112 as well as to the second input of the second two-input summing amplifier 88 through a fifth switch 114. The second phase angle shift network 112 is of the type described with respect to the first phase angle shift network 58.

The output of the third two-input summing amplifier 88 is coupled to the input of a third zero suppression network 116. The third zero suppression network 116 is of the type described with respect to the first zero suppression network 60. The output of the third zero suppression network 116, designated $V_{POL1}$, is coupled to the fourth input of the four input phase comparator 98 through a sixth switch 118. The output of the four input phase angle comparator 98 is coupled to a coincidence timer 120. The coincidence timer 120 measures the duration of the phase coincidence of the four signals ($V_{OP}'$; $V_{POL1}$; $V_{POL2}$; and $V_{POL3}$) input to the four-input phase angle comparator 98, and operates when this phase coincidence occurs for a predetermined minimum time, typically 90 electrical degrees, which is equal to the minimum relay operate time. The output of the coincidence timer 120 is a trip signal which causes the operation of the pole of a circuit breaker associated with the same phase as the relay. Further detailed description of coincidence timer circuitry relating to protective relaying can be found in previously referenced U.S. Pat. No. 4,034,269 as well as U.S. Pat. No. 4,161,011, of Stanley B. Wilkinson, one of the co-inventors of the present invention, which has been assigned to the assignee of the present invention, and the teachings of which patent are incorporated by reference into this detailed description as if fully set forth herein.

The operation of the ground distance relay has some similarity to the operation of the phase distance relay shown and described in U.S. Pat. No. 4,420,788, previously incorporated by reference into this detailed description as if fully set forth herein. The principle difference between the ground distance relay of the present invention and the phase distance relay described in the '788 patent is the restriction of operation of the ground distance relay by the addition of the second, $V_{POL2}$, and the third, $V_{POL3}$, polarizing signals on interphase faults and external faults as described herein. For ground faults internal to the zone of protection, the signals $V_{VPOL2}$ and $V_{POL3}$ will either be essentially in phase with the operate signal, $V_{OP}$, or more typically, because of fault resistance, the phase position of $V_{VPOL2}$ and $V_{POL3}$ will lie between the phase position of $V_{POL1}$ and $V_{OP}$. Therefore, for internal single line to ground faults, the ground distance operating characteristic will be determined by the $V_{OP}$ and $V_{POL1}$ signals and thus will have the same dynamic characteristic on single line to ground faults as the phase distance relay on interphase faults.

A steady state characteristic will be similar to that of the phase distance relay except that the ground distance relay utilizes the positive sequence voltage, $V_1$, in the $V_{POL1}$ signal rather than the $V+KV_1$ quantity used in the phase distance relay. $V_1$ provides better accommodation of the much larger and more linear fault resistance expected on single line to ground faults compared to interphase faults, since the voltage drop in the fault resistance will produce less phase shift in the $V_1$ signal as compared to the $V+KV_1$ quantity. The phase shift due to the voltage drop across the fault resistance is in a direction to reduce the fault resistance coverage.

A further advantage of using $V_1$ (instead of $V+KV_1$) in the first polarizing signal $V_{POL1}$, is that the forward offset, which is used to shift the characteristic away from the origin to minimize response to load current, cannot shift the characteristic away from the origin for single line to ground faults. This is possible for the phase distance relay on phase to phase faults using $V+KV_1$ in the polarizing signal. In the ground distance relay, the offset signal, $I_{A1}Z_{R1}$, is clipped at 0.25 per unit voltage, whereas the minimum value of $V_{AG1}$ will be greater than 0.5 per unit voltage for single line to ground fault. Thus, the forward offset signal cannot reverse the polarizing signal, causing the characteristic to shift away from the origin.

The ground relay 50 of the present invention utilizes the signals developed, as previously described with reference to FIG. 1, as follows. The use of both zero sequence and negative sequence polarizing signals permits improved descrimination between internal and external faults as follows. Operation on external double line to ground faults is precluded since the negative and zero sequence polarizing signals are approximately in phase in the unfaulted-phase relay and 120° out of phase in the faulted-phase relays. On reverse single line to ground faults, the negative and zero sequence polarizing signals are approximately 180° out of phase with the positive sequence polarizing signal in the faulted phase relay, and 120° out of phase with each other in the unfaulted phase relays. Operation on external (and some internal) phase-to-phase faults is inhibited by the absence of zero sequence current (the zero suppression in the $I_0Z$ polarizing signal eliminates operation on spurious levels of $I_0$ due to dissymmetry in the power system). Operation on external three phase faults is blocked by the absence of zero and negative sequence quantities.

To inhibit operation on forward, external single line to ground faults, the negative and zero sequence polarizing signals preclude operation on the unfaulted phases because they are approximately 120° apart. In the faulted phase, the negative and zero sequence reactance characteristics will coordinate with the locus of the fault impedance under load flow conditions where the negative and zero sequence currents in the relay are in phase with the negative and zero sequence currents in the fault. Due to dissimilar impedance angles in the power system, the relay and fault components of current can have different phase angles, which are compensated for by the phase shift in zero and negative sequence polarizing signals.

For close-in single line to ground faults with fault resistance very much larger than the source impedance, there is a tendency for the phase leading the faulted phase to operate, particularly with load flow in the tripping direction. The use of both negative and zero sequence polarizing signals precludes operation of the unfaulted phase relays since the negative and zero sequence signals are approximately 120° apart. For remote end single line to ground faults, the leading unfaulted phase relay will have a tendency to operate on single line to ground faults with load flow in the tripping direction and low ratios of total zero sequence impedance to total positive sequence impedance, but is also prevented from operation by the angular separation (120°) of the negative and zero sequence polarizing signals.

To permit the ground distance relays to operate on close-in, severe double line to ground faults to enhance the speed of operation of the relay system, the $3I_0Z_{R1}$ polarizing signal is added to the negative sequence polarizing signal with a higher weighting factor to bring the second and third polarizing quantities closer in phase. To limit this effect to severe close-in faults, the $3I_0Z_{R1}$ signal must be greater than the zero suppression level. If the fault currents are very large for close-in single line to ground faults with fault resistance very much larger than the source impedance, operation of the leading phase could be permitted if $3I_0Z_{R1}$ is substantially above the zero suppression level. To prevent operation of the leading phase for this case, the $I_0K_0Z_{R0}$ signal in the operate circuit is clipped to a maximum value of 0.7 per unit voltage. Thus the normal restraint voltage in the leading phase limits the coincidence between the leading phase polarizing signals to less than the coincidence timer setting (assuming a 90° timer setting).

In some unusual applications, where a reverse double line to ground fault occurs, and the relay has long reach settings, and the sources at the remote end of the line have a very large ratio between the positive and zero sequence source impedances, the $I_0K_0Z_{R0}$ could be much larger than the $V_G$ restraint voltage which would cause operation of the unfaulted phase relay if the $I_0K_0Z_{R0}$ were not clipped at 0.7 per unit voltage.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention that come within the true spirit and scope of our invention.

We claim:

1. In a ground distance protective relay for protecting a three-phase alternating current power transmission line by generating a tripping signal in response to a fault on any phase of the line in a predetermined zone of protection, the relay being of the phase comparator type and including: phase coincidence detection means responsive to input signals supplied thereto for developing an output signal when there is phase coincidence between said input signals, a first of said input signals being an operating signal and a second of said input signals being a first polarizing signal, and timer circuit means for developing an output responsive to the output signal from said phase coincidence detecting means continuing for a predetermined duration, the improvement comprising:
   means for developing a third input signal that is supplied to said phase coincidence detection means, said third input signal being a second polarizing signal proportional to that portion of a signal (i) which exceeds a predetermined threshold value and (ii) which is related to the product of a signal proportional to the net current flowing in all three phases of the transmission line and the positive sequence replica impedance.

2. A protective relay in accordance with claim 1 wherein said improvement additionally comprises means for developing a fourth input signal that is supplied to said phase coincidence detection means, said fourth input signal being a third polarizing signal comprising a signal related to the product of a negative sequence component of the current flowing in a predetermined phase and an impedance $Z_1$ having the same angle as the positive sequence line impedance angle.

3. A protective relay in accordance with claim 2 wherein said third polarizing signal is proportional to the sum of:
   (a) said signal related to the product of the negative sequence component of the current flowing in the predetermined phase and $Z_1$; and
   (b) that portion of a signal which exceeds a predetermined threshold value and which is related to the product of the net current flowing in all three phases of the system and the positive sequence replica impedance.

4. In a ground distance protective relay for protecting a three-phase alternating current power transmission line by generating a tripping signal in response to a fault on any phase of the line in a predetermined zone of protection, the relay being of the phase comparator type and including: phase coincidence detection means responsive to input signals supplied thereto for developing an output signal when there is phase coincidence between said input signals, a first of said input signals being an operating signal and a second of said input signals being a first polarizing signal, and timer circuit means for developing an output responsive to the output signal from said phase coincidence detecting means continuing for a predetermined duration, the improvement comprising:
   (a) means for developing a third input signal that is supplied to said phase coincidence detection means, said third input signal being a second polarizing signal comprising a signal related to the product of a signal proportional to the net current flowing in all three phases of the system and a positive sequence replica impedance; and
   (b) means for developing a fourth input signal supplied to said phase detection means, said fourth input signal being a third polarizing signal which is related to $I_{A2}Z_1$, where $I_{A2}$ is a signal proportional to the negative sequence component of the current flowing in a predetermined phase and $Z_1$ is an impedance having the same angle as the positive sequence line impedance angle.

5. A protective relay in accordance with claim 4 wherein said third polarizing signal is related to the sum of:
(a) said $I_{A2}Z_1$ quantity; and
(b) that portion of a signal which exceeds a predetermined threshold value and which is related to the product of a signal $I_0$ proportional to the net current flowing in all three phases of the transmission line and the positive sequence replica impedance $Z_{R1}$.

6. In a ground distance protective relay for protecting a three-phase alternating current power transmission line by generating a tripping signal in response to a fault on any phase of the line in a predetermined zone of protection, the relay being of the phase comparator type and including: phase coincidence detection means responsive to input signals supplied thereto for developing an output signal when there is phase coincidence between said input signals, a first of said input signals being an operating signal and a second of said input signals being a polarizing signal, and timer circuit means for developing an output responsive to the output signal from said phase coincidence detecting means continuing for a predetermined duration, the improvement comprising:
(a) means for deriving said first input signal from component signals that are summed together;
(b) means for deriving said second input signal from component signals that are summed together; and
(c) clipping means for limiting to a predetermined maximum value at least one of said component signals.

7. A protective relay in accordance with claim 6 in which the means for deriving said second input signal comprises:
(a) offset select means for developing as one of said component signals an offset component signal proportional to $I_{A1}Z_{R1}$, where $I_{A1}$ is the positive sequence component of current flowing in a predetermined phase and $Z_{R1}$ is the positive sequence replica impedance; and
(b) clipping means for limiting said offset component signal to a predetermined maximum value.

8. A ground distance protective relay in accordance with claim 6 wherein:
(a) said operating signal is derived from a component signal $I_0K_0Z_{R0}$, where $I_0$ is the zero sequence component of current in a predetermined phase and $K_0Z_{R0}$ is the zero sequence replica impedance; and
(b) said clipping means acts to limit said $I_0K_0Z_{R0}$ signal to a predetermined maximum value.

9. A ground distance protective relay in accordance with claim 6 wherein:
(a) said operating signal is derived from a component signal $I_0Z_{R1}$, where $I_0$ is the zero sequence component of current in a predetermined phase, and $Z_{R1}$ is the positive sequence replica impedance; and
(b) said clipping means acts to limit said $I_0Z_{R1}$ signal to a predetermined maximum value.

10. A ground distance protective relay in accordance with claim 6 wherein said operating signal is derived from the sum of two component signals which are respectively limited to predetermined maximum values by said clipping means, one of said component signals being $I_0K_0Z_{R0}$, where $I_0$ is the zero sequence component of current in a predetermined phase and $K_0Z_{R0}$ is the zero sequence replica impedance, and the other of said component signals being $-I_0Z_{R1}$, where $Z_{R1}$ is the positive sequence replica impedance.

11. A ground distance protective relay in accordance with claim 3 wherein said second input signal is derived from component signals that are summed together, and one of said component signals is developed by:
(a) offset select means for developing an offset component signal proportional to $I_{A1}Z_{R1}$, where $I_{A1}$ is the positive sequence component of current in said predetermined phase and $Z_{R1}$ is the positive sequence replica impedance; and
(b) clipping means for limiting the magnitude of said offset select means to a predetermined maximum value.

12. A relay in accordance with claim 11 wherein:
(a) said operating signal is derived from the sum of the following signals:
  (i) $I_0K_0Z_{R0}$, where $I_0$ is the zero sequence component of current in said predetermined phase and $K_0Z_{R0}$ is the zero sequence replica impedance; and
  (ii) $-I_0Z_{R1}$, where $Z_{R1}$ is the positive sequence replica impedance; and
(b) clipping means is provided for limiting each of said signals $I_0K_0Z_{R0}$ and $-I_0Z_{R1}$ to predetermined maximum values before summing thereof.

13. A relay in accordance with claim 12 wherein the following additional signals are summed with $I_0K_0Z_{R0}$ and $-I_0Z_{R1}$ for developing said operating signal: $I_AZ_{R1}$ and $-V_{AG}$, where $I_A$ is proportional to the current in said predetermined phase and $V_{AG}$ is proportional to voltage between said predetermined phase and ground, whereby said operating signal is a function of $(I_A-I_0)Z_{R1}+I_0K_0Z_{R0}-V_{AG}$ when the signals $-I_0Z_{R1}$ and $I_0K_0Z_{R0}$ are below the clipping levels of their respective clipping means.

* * * * *